United States Patent [19]

Rao et al.

[11] Patent Number: 4,483,357

[45] Date of Patent: Nov. 20, 1984

[54] METHOD FOR TWO STAGE IN-LINE ACID MIXING

[75] Inventors: Jagdish J. Rao, Brown Deer; James K. Jeglum, Janesville, both of Wis.

[73] Assignee: Globe-Union Inc., Milwaukee, Wis.

[21] Appl. No.: 468,325

[22] Filed: Feb. 22, 1983

[51] Int. Cl.³ ............................................. G05D 11/06
[52] U.S. Cl. ........................................... 137/3; 137/91
[58] Field of Search ............ 137/88, 91, 3, 93, 505.12, 137/5

[56] References Cited

U.S. PATENT DOCUMENTS

| | | | |
|---|---|---|---|
| 1,883,690 | 10/1932 | Gilgenberg | 137/505.12 |
| 2,868,216 | 1/1959 | Robertson | 137/3 X |
| 4,091,834 | 5/1978 | Frigato | 137/93 |

FOREIGN PATENT DOCUMENTS 2046383  4/1972  Fed. Rep. of Germany ........ 137/91

Primary Examiner—Martin P. Schwadron
Assistant Examiner—Stephen M. Hepperle
Attorney, Agent, or Firm—Joseph J. Jochman, Jr.; Larry L. Shupe; John P. Ryan

[57] ABSTRACT

A method of preparing mixtures of dilute acid of varying final specific gravities utilizes microprocessor controlled mixing in two in-line stages. Process recycled or production reject acid or water is initially mixed with concentrated acid and directed to an intermediate heat exchanger for removing the exothermic heat generated during mixing. The specific gravity of the mixture exiting from the heat exchanger is continuously measured and fed to a microprocessor which calculates the deviation between the measured specific gravity and a preselected set point specific gravity which is greater than the desired final specific gravity. The calculated deviation is used to generate a control signal which, in turn, is applied to adjust the flow of concentrated acid until the measured specific gravity corresponds to the set point specific gravity. In the second stage, the set point specific gravity acid/water is mixed with water and the specific gravity of this second stage mixture is continuously measured and also fed to the microprocessor which calculates the deviation between the measured specific gravity and the final desired specific gravity. A second control signal based on the second calculated deviation is generated to adjust the flow of water to provide a second stage mixture of the desired final specific gravity. The method is particularly adaptable to providing sulfuric acid mixtures of various specific gravities typically utilized in the manufacture of lead-acid batteries.

10 Claims, 1 Drawing Figure

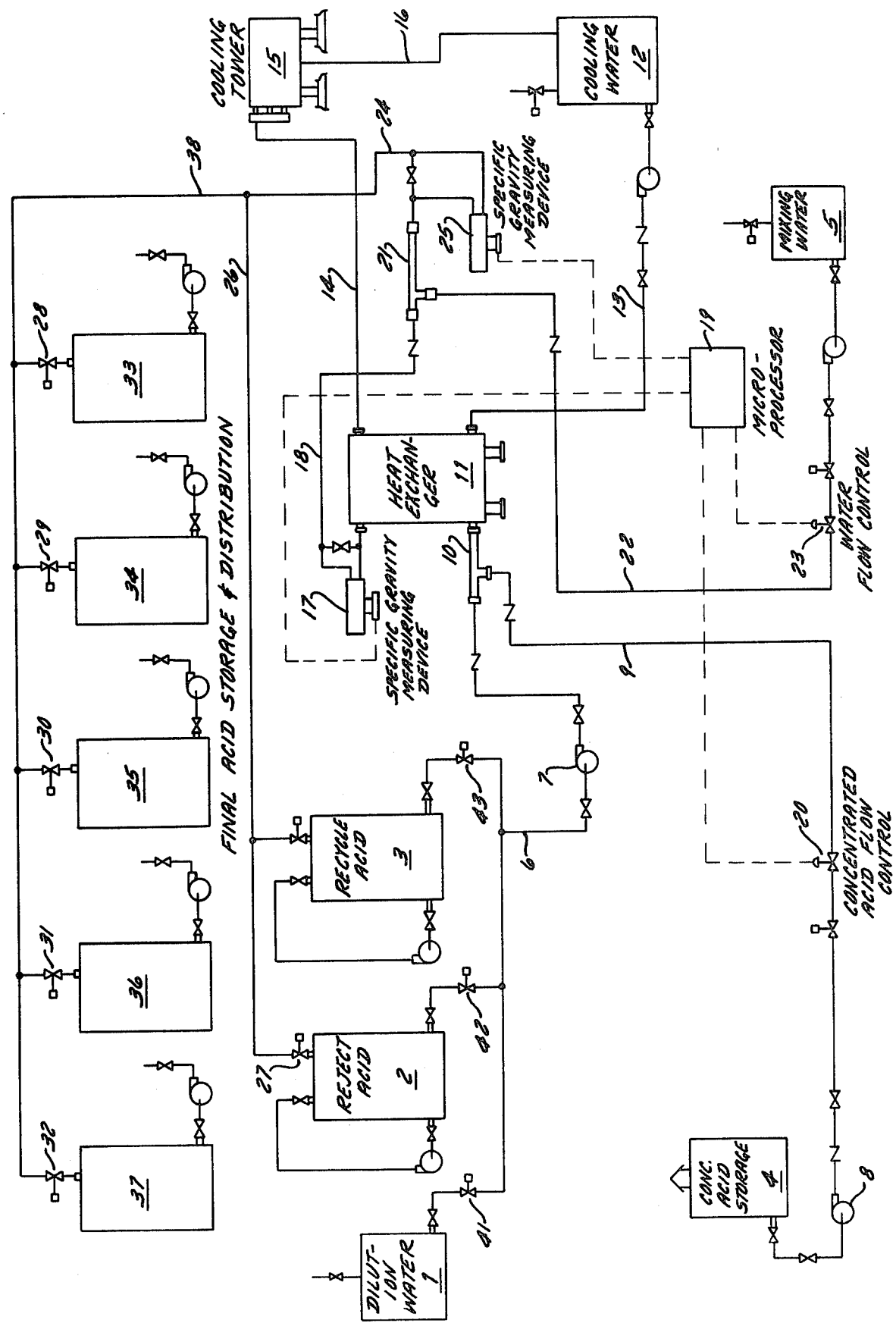

METHOD FOR TWO STAGE IN-LINE ACID MIXING

BACKGROUND OF THE INVENTION

The present invention relates to methods or processes for preparing water diluted mixtures of acids and, in particular, to the preparation of dilute sulfuric acid of varying specific gravities for use in the manufacture of lead-acid storage batteries.

Dilute sulfuric acid is an important component in the manufacturing of lead-acid storage batteries. It is used to form the paste of the dry active materials for both the positive and negative electrodes, for the electrolyte used in the formation process, and for the final battery electrolyte. As is well known in the art, acids of varying specific gravities are required for each of the various uses and each particular use may itself require varying specific gravities, depending on the type of battery being made. In a typical lead-acid automotive battery manufacturing plant, sulfuring acid mixes having specific gravities ranging from about 1.150 to 1.350 are required. Further, precise control of the specific gravity of each acid mix is critical to the manufacturing process and, ultimately, to the performance of the batteries.

Many battery manufacturing plants still use simple batch methods for the preparation of sulfuric acid mixes. In these processes open lead-lined steel tanks are filled with concentrated sulfuric acid and water or recycled plant acid while manually controlling the flows based on crude preliminary calculations utilizing initial specific gravity measurements. The acid and water are mixed within the tank, the specific gravity is checked by withdrawing a sample, and acid or water is added by trial and error until the final desired specific gravity is reached. The exothermic heat generated during mixing typically raises the temperature of the acid batch to about 190° to 240° F. (88° to 116° C.) and continuous recirculation for periods of several hours may be required to cool the acid to a required temperature of something less than 125° F. (52° C.). The cooled acid is finally transferred to a storage tank from which it is removed for direct utilization in a battery manufacturing process. Typically, a series of batch mixing tanks is required so that several acids of different specific gravities can be prepared at one time. The entire process is tedious and time consuming.

When acid is batch mixed in open tanks, contamination is unavoidable, acid fumes are emitted and health and corrosion problems result. In addition, stratification of the varying densities of acids and water results and a true measurement of specific gravity is difficult to make. Finally, if slow cooling by recirculation is employed, corrections must be made for the resultant variations in specific gravity with reductions in temperature.

More recently, attempts have been made to automate and provide more direct control in sulfuric acid mixing processes. It is known, for example, to provide one-step mixing by combining concentrated acid and dilute acid or water utilizing simultaneous control over the flow valves from both component sources. The use of heat exchangers to cool the acid heated during mixing is also known. Nevertheless, such one-step in-line mixing is still essentially a batch process and suffers from the same lack of flexibility. Additionally, it has been found to be extremely difficult to control the flow of concentrated sulfuric acid in a single stage mixing process. The amount of concentrated acid typically required to be mixed with water or lower specific gravity recycle acid to obtain the final specific gravity acid is relatively small. Consequently, extremely small adjustments are required in the low volume flow of concentrated acid. With the valves typically used, the proper adjustments cannot be made or maintained for the time periods required. The result is poor control of the final specific gravity and the creation of unacceptably high volumes of reject acid. Further, it is impossible with prior art one-step mixing methods to use recycled process acid of a given specific gravity to produce a desired final acid mixture with a lower specific gravity, because the single step addition of concentrated acid can only be used to raise the specific gravity. As a result, battery manufacturing plants may often generate large volumes of potential recycle acid which, with a one-step method, can only be used to a limited extent in preparing higher specific gravity and mixtures. Such plants may thus be faced with extremely burdensome problems of neutralization or other acid disposal methods.

SUMMARY OF THE INVENTION

The method of the present invention utilizes two-stage in-line mixing to provide extremely accurate control of the final specific gravity and broad flexibility in the range of specific gravity acids required in a typical battery manufacturing facility. The specific gravities of the mixtures at each of the two stages are continuously measured and fed to a microprocessor which compares the measured specific gravities to an intermediate set point specific gravity and the desired final specific gravity, respectively, and calculates the deviation in each case. Control signals are generated from each calculated deviation and utilized to control one component of flow at each mixing stage. The actual measurement of flow of any component is obviated.

The desired final specific gravity acid is piped directly to a closed storage tank. The microprocessor is programmed to readily adjust to make the calculations and alter the flows to provide acid of any density required for the battery manufacturing operations. Open mixing tanks and all of the attendant problems are eliminated. The control problems and resultant inaccuracies in final specific gravity which are inherent in one-step in-line mixing are also completely eliminated. The method of the present invention is adaptable to use recycle and reject acid of virtually any specific gravity produced in a lead-acid battery manufacturing plant.

BRIEF DESCRIPTION OF THE DRAWING

The single FIGURE shows a process diagram of an acid mixing system utilizing the two-stage in-line method of present invention.

DESCRIPTION OF THE PREFERRED EMBODIMENT

In the drawing, a process layout shows a typical sulfuric acid mixing system used in a battery manufacturing plant and embodying the method of the present invention. The components of the sulfuric acid/water mixtures of the various specific gravities utilized in the manufacture of batteries are typically obtained from a number of sources and stored in tanks. For the first stage mixing, these include a water tank 1 containing ordinary tap water, a reject acid tank 2 for acid mixed by the present method of an incorrect specific gravity (as during periods of process adjustment), a recycle acid tank 3 for process acid used in the battery manufacturing operation but not consumed, and a concentrated sulfuric acid tank 4 which supplies concentrated sulfuric acid at its maximum specific gravity of 1.835 to raise the specific gravity of the initial first-stage mixture to the intermediate set point value, as will be described hereinafter. For the second-stage mixing and to provide the acid of the desired final specific gravity, the first-stage mixture is combined with ordinary tap water from a mixing water tank 5, the flow from which is the controlled variable in the second stage.

To prepare an acid mixture of a desired final specific gravity, a flow of water, reject acid, or recycle acid from one of tanks 1, 2, or 3, respectively, is caused to flow through line 6 by pump 7 at a rate manually fixed by predetermined calculation. Simultaneously, a flow of concentrated acid from the storage tank 4 is pumped by pump 8 through line 9 at a flow rate determined by preliminary calculation to provide a first-stage mixture with a specific gravity of approximately 1.400 (or any other specific gravity greater than the desired final specific gravity). This is the target or first-stage set point specific gravity. The flows in lines 6 and 9 are combined in a mixing T 10. As is well known in the art, the mixing of concentrated sulfuric acid with water or dilute sulfuric acid creates an exothermic generation of heat, such that the temperature of the first mixture in T 10 is heated substantially. The initial temperature of the first mixture is generally in the range of about 190° to 240° F. (88° to 116° C.). Because high temperature acid is unsuitable for use in any battery manufacturing operation, the first mixture is directed from T 10 into and through a heat exchanger 11. The heat exchanger may, for example, be a carbon block type using cooling water from a source 12 which is pumped to the heat exchanger through line 13 and subsequently recirculated to the source 12 via line 14, cooling tower 15, and line 16. Preferably, the heat exchanger will lower the initial temperature of the first mixture to a range of about 90° to about 115° F. (32° to 46° C.).

It is desirable to maintain the specific gravity of the cooled first mixture at a set point of 1.400, as mentioned above. The set point specific gravity is established at a level somewhat higher than the highest specific gravity of any desired final acid mixture for use in the various battery manufacturing processes. A specific gravity measuring device 17 is installed in the outlet line 18 from the heat exchanger 11. The device may be any one of a number which are commercially available, for example, a Dynatrol unit manufactured by Automation Products, Inc. The specific gravity of the first mixture is continuously measured and fed to a microprocessor 19 which is programmed to calculate any deviation between the measured specific gravity and the set point specific gravity. The microprocessor in turn generates a first control signal representative of the calculated deviation. The first control signal is directed to a concentrated acid flow control valve 20 in line 9 and operates the valve to adjust the flow of concentrated acid to establish parity between the measured specific gravity of the first mixture and the set point specific gravity.

The first mixture at the set point specific gravity continues to flow through line 18 to a second mixing T 21 where the second-stage mixing occurs. In the second mixing T 21, the first mixture is combined with a second flow of water from storage tank 5 through line 22. The second flow of water dilutes slightly the first mixture at the set point specific gravity to provide the desired mixture at the final specific gravity which exits from the mixing T 21 via line 24. To provide any final required adjustment to the specific gravity, a second specific gravity measuring device 25 is installed in line 24 and continuously measured the specific gravity of the final mixture. The measured specific gravity of the mixture in line 24 is fed to the microprocessor 19 where it is compared with the stored value of the preselected desired final specific gravity. The microprocessor automatically calculates any deviation between the measured specific gravity and the desired final specific gravity and generates a second control signal which, in turn, is used to adjust a water flow control valve 23 in line 22. The second flow of water through valve 23 is automatically adjusted to establish parity between the measured specific gravity in line 24 and the desired final specific gravity.

The mixing method employed by the foregoing process is readily adaptable to provide a continuous flow of acids at various desired final specific gravities. During the period of initial adjustment of the system or when changing from one final specific gravity acid to another, the continuous flow of acid at an incorrect specific gravity in line 24 is diverted to the reject acid tank 2 by opening valve 27 and directing the flow through the reject acid line 26. This intermediate diversion is also automatically controlled by applying the second control signal generated by the microprocessor. When the two-stage adjustments have been properly made to provide a final desired specific gravity flow in line 24, valve 27 is automatically closed on a signal from the microprocessor 19 and the appropriate one of the valves 28 through 32 controlling the flow to final acid storage tanks 33 to 37, respectively, is automatically opened by the control signal from the microprocessor and the flow of acid at a desired final specific gravity is directed from line 24 through line 38 to the appropriate final acid storage tank. When, for example, the final acid storage tank 33 is filled, a level sensing device in the tank operates to close the fill valve 28. Simultaneously, that valve closure signals the microprocessor to reopen valve 27 to the reject acid tank 2 and to generate a new second control signal to adjust the second water flow control valve 23 to provide the next preselected final specific gravity acid flow in line 24. Until the flow in line 24 is properly adjusted for the next desired final specific gravity, the mixed acid flow in line 24 is diverted via line 26 to the reject acid tank 2. The eventual establishment of parity between the actual specific gravity as measured by the unit 25 in line 24 and the next preselected desired final specific gravity results in the generation of appropriate control signals to close valve 27 and open, for example, valve 29 to final acid storage tank 34 for receipt of the acid at the next desired final specific gravity via line 38. The process continues to automatically repeat and provide varying final specific gravity acids for storage tanks 35, 36 and 37, as may be required.

The microprocessor 19 used to provide control for the method of the present invention may be, for example, a Modicon model 484 programmable controller having analog input and output capability. The microprocessor is programmed to apply digital PID (proportional integral derivative) control algorithms to produce output control signals to conventional pneumatic actuators for adjusting or operating the various valves in the system. The specific gravity of the mixture measured by either of the specific gravity measuring devices 17 or 25 is converted to an output voltage signal varying from 1 to 5 vdc to the microprocessor 19 where the deviation from the set point or the final specific gravity is calculated and an output control signal varying from 4 to 20 milliamps is generated. The output signal is converted in a current to pressure transducer to a pneumatic signal which operates an actuator for adjusting the concentrated acid flow control valve 20 or the water flow control valve 23.

It is important to note that the method of the present invention does not require the actual measurement of the volume of flow of the acid mixtures or any of their components at any point. As a result, flow meters are not required. The microprocessor memory is also utilized to store the control signals previously generated and used for a particular final specific gravity acid. This information may be subsequently recalled from the microprocessor memory and used to reduce the time for process readjustment. As a result, a final specific gravity of any desired mixture within the range typically required can be achieved in less than seven minutes, and, in most cases, in less than four minutes. Overall, the process time is kept to a minimum and the generation of undesirable volumes of reject acid is also minimized. A set of alarm conditions, such as excessively high temperature acid from the heat exchanger 11 or a lack of component flow from any one of the mixing sources, may also be monitored by the microprocessor and used to register an alarm and/or shut down the system in the event a problem occurs.

It is also possible to establish the set point specific gravity of the first stage mixture by adjustment of the water or dilute acid component of the mixture, rather than the flow of concentrated acid. In that case, the flow of concentrated acid would be preset and maintained at a constant rate, and an appropriate water, reject acid, or recycle acid flow control valve 41, 42 or 43 from tank 1, 2, or 3, respectively, would be operated by the first control signal from the microprocessor in essentially the manner previously described. Such control, however, would limit somewhat the flexibility of the process to provide acid mixture with the desirable wide range of final specific gravities.

The specific gravities of battery manufacturing acids are typically measured to three decimal places with an allowable tolerance of ±0.003. Control of final specific gravities well within this range is easily attained in the process described herein. A typical system, operating as described, can produce a continuous flow of varying specific gravity acids of from 25 to 35 gpm which is sufficient to provide the needs for a battery plant manufacturing up to 15,000 batteries per day.

We claim:

1. The method of preparing mixtures of acid and water of varying desired final specific gravities in two continuous in-line stages comprising the steps of:
   a. mixing a first flow of water or dilute acid and a flow of concentrated acid to provide a first stage mixture;
   b. establishing a set point specific gravity for the first stage mixture which is greater than the specific gravity of the desired final mixture;
   c. continuously measuring the actual specific gravity of the first stage mixture;
   d. utilizing a programmed microprocessor to calculate the deviation between the measured specific gravity of the first stage mixture and the set point specific gravity;
   e. generating a first control signal based on the calculated deviation;
   f. utilizing the first control signal to adjust the flow of one component of the first stage mixture to establish parity between the measured specific gravity of the first stage mixture and the set point specific gravity;
   g. selecting a specific gravity for a desired final mixture;
   h. mixing a flow of the first stage mixture at the set point specific gravity and a second flow of water to provide a second stage mixture;
   i. continuously measuring the actual specific gravity of the second stage mixture;
   j. utilizing the microprocessor to calculate the deviation between the measured specific gravity of the second stage mixture and the specific gravity of the desired final mixture;
   k. generating a second control signal based on the calculated deviation from the preceding step;
   l. utilizing the second control signal to adjust the second flow of water to establish parity between the measured specific gravity of the second stage mixture and the specific gravity of the desired final mixture; and
   m. directing the flow of the second stage mixture at the final specific gravity to a reservoir.

2. The method as set forth in claim 1 including the intermediate step of passing the first stage mixture through a heat exchanger to remove at least a portion of the exothermic heat of mixing.

3. The method as set forth in claim 2 wherein the specific gravity of the first stage mixture is measured subsequent to passage through the heat exchanger.

4. The method as set forth in claim 1 wherein the first control signal is utilized to adjust the flow of concentrated acid.

5. The method as set forth in claims 1, 2, 3, or 4 including the intermediate steps of:
   a. diverting the flow of the second stage mixture from step h to a source of the flow of dilute acid; and,
   b. terminating the diversion of the flow of the second stage mixture prior to step m.

6. The method of preparing mixtures of acid and water of varying desired final specific gravities comprising the steps of:
   a. mixing a first flow of water or dilute acid and a flow of concentrated acid to provide a first mixture;
   b. passing the first mixture through a heat exchanger to remove at least a portion of the exothermic heat of mixing;
   c. establishing a set point for the specific gravity of the first mixture which is greater than the specific gravity of the desired final mixture;
   d. measuring the actual specific gravity of the first mixture as it exits from the heat exchanger;
   e. utilizing a programmed microprocessor to calculate the deviation between the actual specific gravity of the first mixture and the set point;
   f. generating a first control signal based on the calculated deviation;
   g. utilizing the first control signal to adjust, if necessary, the flow of concentrated acid to establish parity between the actual specific gravity of the first mixture and the set point;
   h. selecting a specific gravity for a desired final mixture;

i. mixing a flow of the first mixture at the set point specific gravity and a second flow of water to provide a second mixture;

j. measuring the actual specific gravity of the second mixture;

k. utilizing the microprocessor to calculate the deviation between the measured specific gravity of the second mixture and the desired final specific gravity;

l. generating a second control signal based on the calculated deviation from the preceding step;

m. utilizing the second control signal to adjust, if necessary, the second flow of water to establish parity between the actual specific gravity of the second mixture and the final specific gravity; and, n. directing a flow of the second mixture at the final specific gravity to a reservoir.

7. The method as set forth in claim 6 wherein the acid is sulfuric acid.

8. The method as set forth in claim 7 wherein the first mixture is cooled to a temperature of less than 125° F. (52° C.).

9. The method as set forth in claim 6 including the step of diverting, simultaneously with steps a through m, the flow of the second mixture to the source of the flow of dilute acid in step a.

10. The method as set forth in claim 6 including the additional steps of:

a. establishing a maximum level for the second mixture in the reservoir;

b. generating a level control signal when the maximum level is reached;

c. utilizing the signal to terminate the flow of the second mixture to the reservoir and to divert the flow of the second mixture to the source of the flow of dilute acid;

d. selecting a specific gravity for a second desired final mixture;

e. substituting the second desired final specific gravity for the final specific gravity in steps k through m;

f. repeating steps k through m;

g. terminating the flow of the second mixture to the source of the flow of dilute acid in response to the establishment of parity in step m; and, h. directing a flow of the second mixture at the second final specific gravity to a second reservoir.

* * * * *